United States Patent
Eschenburg

[11] Patent Number: 6,139,461
[45] Date of Patent: Oct. 31, 2000

[54] REVERSE BEVEL GEAR DIFFERENTIAL

[75] Inventor: Dale Jerome Eschenburg, Rochester Hills, Mich.

[73] Assignee: Meritor Heavy Vehicle Systems, LLC, Troy, Mich.

[21] Appl. No.: 09/371,108

[22] Filed: Aug. 10, 1999

[51] Int. Cl.[7] .................................................. F16H 48/08
[52] U.S. Cl. .......................................... 475/230; 475/231
[58] Field of Search ..................................... 475/230, 231

[56] References Cited

U.S. PATENT DOCUMENTS

| | | |
|---|---|---|
| 477,057 | 6/1892 | Kitten ........................................ 475/230 |
| 3,915,032 | 10/1975 | Ottemann ................................. 475/231 |
| 5,304,103 | 4/1994 | Schlosser ................................. 475/230 |
| 5,662,544 | 9/1997 | Schlosser et al. ....................... 475/230 |
| 6,066,063 | 5/2000 | Ishikawa ................................. 475/231 |

*Primary Examiner*—Sherry Estremsky
*Attorney, Agent, or Firm*—Carlson, Gaskey & Olds

[57] ABSTRACT

An improved differential incorporates gear teeth profiles which result in a force on the differential pinion gears directed radially inwardly. Thus, the gears are forced onto the differential spider, and need not be supported in the differential case. The invention thus allows the elimination of the differential case.

4 Claims, 1 Drawing Sheet

REVERSE BEVEL GEAR DIFFERENTIAL

BACKGROUND OF THE INVENTION

This invention relates to a differential gear construction that allows the elimination of the differential case, while still providing adequate support for the pinion gears.

Differential gear assemblies are utilized to split drive from a single input shaft to two output shafts. Differentials are typically used in vehicles to split a single drive input to the two areas of the vehicle.

In one standard differential, an input drives a differential spider. The differential spider has a cylindrical hub and a plurality of spider hubs extend radially outwardly of the hub. Pinion gears are mounted on each of the spider hubs. The pinion gears engage and drive first and second side gears, and are free to rotate on the spider hubs. In this type differential, rotation of the spider drives the first and second side gears. The side gears drive shafts associated with distinct parts of a vehicle, such as the front and rear axles.

In the past, the pinion gears and the side gears have bevel teeth profiles which have a smaller diameter at radially inner locations and which expand to a greater diameter in a radially outward direction. This gear tooth geometry results in a resultant force, forcing the pinion gears radially outwardly. The prior art has not been compromised by this force since the spider hubs are received in a differential housing which supports the pinions. However, this has required the housing to be used.

It would be desirable to eliminate the differential housing.

SUMMARY OF THE INVENTION

In a disclosed embodiment of this invention, a differential has its pinion gears supported on the side gears. The spider hubs do not extend into a differential case. Rather, the pinion gears preferably extend to the radially outermost extent of the spider hub.

The present invention supports the pinion gear on the side gears by reversing the standard tooth geometry. The teeth in the present invention have a greater diameter at radially inner locations and move to smaller diameters in a radially outward direction. Due to this geometry, the resultant forces on the pinion gears are radially inward. Thus, the pinion gears need not be supported in a differential case. The differential case is preferably eliminated.

In a further feature of this invention, a differential sliding shift collar couples the drive gear to the input shaft when a differential lock is desired. In the prior art, the differential case housing was utilized as one component in creating the differential lock. The elimination of the differential case by this invention removes the ability to utilize the differential case housing.

These and other features of the present invention can be best understood from the following specification and drawings, the following of which is a brief description.

DETAILED DESCRIPTION OF A PREFERRED EMBODIMENT

Figure 1:
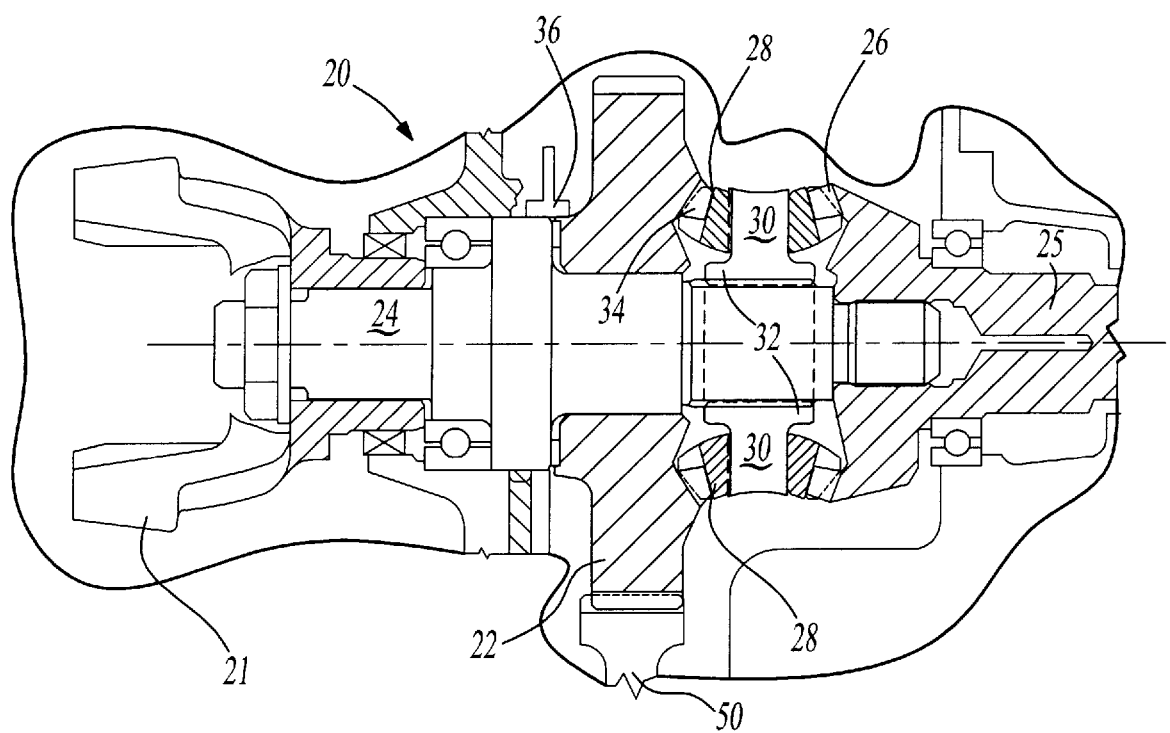
FIG. 1 is a schematic view of a differential case incorporating the present invention.

An improved differential 20 includes a drive input 21 which drives input shaft 24. Input shaft 24 is splined to drive spider 32. Spider 32 drives a first side gear 26 which drives shaft 25. The side gears 26 are driven by pinion gears 28 mounted on spider hubs 30 on spider 32. As known, there are a plurality of spider hubs 30 spaced circumferentially about the hub 32, and a plurality of pinion gears 28 mounted on the spider hubs 30. The pinion gears also drive second gear 34. Gear 26 drives shaft 25. Gear 34 drives gear 22 which then drives another shaft through gear 50. Such arrangement are used to drive front and rear vehicle axles.

In the present invention, the teeth profiles between the side gears 26 and 34 are modified such that the differential case can be eliminated. Since the differential case is eliminated, a sliding collar, 36, shown schematically, is utilized to directly connect the input shaft 24 to the gear 34 when a differential lock is desired. The control to decide differential lock is desired and an appropriate collar are known, and form no part of this invention. However, when the collar 36 is in its non-differential lock position, the input shaft 24 drives the spider 32 pinions 28. When pinions 28 rotate about hubs 30, they engage and drive opposed side gears 26 and 34. This drives gears 22 and shaft 25.

Figure 2:
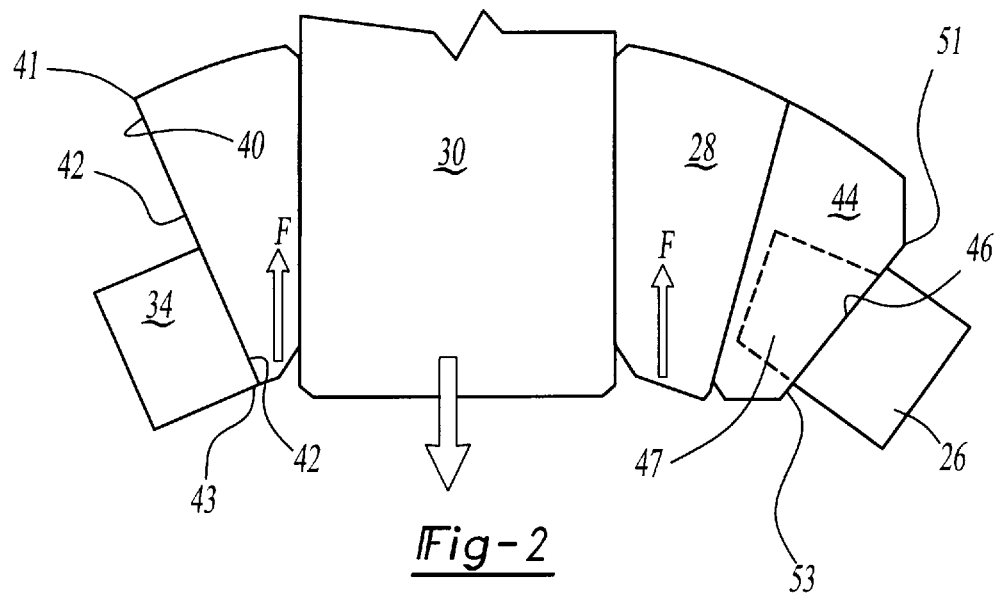
FIG. 2 is an enlarged view showing the tooth profiles of the present invention.

As shown in FIG. 2, the gears 34 and 26 each have a tooth profile with a radially greater inner dimension at a radially inner location which extends to smaller inner diameters in a radially outward direction. As shown, pinion gear 28 has a root portion 40 which is generally frustro-conical, and has a larger diameter at radially inner locations 41 and a smaller diameter at radially outer locations 43. This root portion is engaged by tooth 42 of side gear 34. The tooth 42, shown schematically is also frustro-conically shaped in a similar angle to that of the hub 42. The teeth 44 on pinion 28 are also frustro-conical and are reduced in diameter in a direction extending radially outwardly from inner locations 51 towards outer locations 53. The root section 46 of the side gear is similarly angled. Tooth 47, shown schematically in phantom, of gear 26 is also similarly angled.

Thus, the resultant forces F on the pinion gear 28 are all radially inwardly. The pinion gears 28 are thus forced further onto the hubs 30.

Thus, the present invention allows the elimination of the differential case. The differential case is not necessary to support or retain the pinion gears, since the forces on the pinion gears are radially inward. At the same time, the pinion gears are supported on the side gear teeth, and the present invention does allow the elimination of the differential case. This is an improvement over the prior art. Although a preferred embodiment has been disclosed, it should be understood that various modifications would come within the scope of this invention. As one example, while a particular differential has been shown, it should be understood that the above-described invention would have application in many distinct types of differentials. The unique gear tooth geometry eliminates the need for a differential case, and thus is an improvement on the prior art.

A worker of ordinary skill in this art would recognize that certain modifications would come within the scope of this invention. For that reason, the following claims should be studied to determine the true scope and content of this invention.

What is claimed is:

1. A gear differential comprising:

a first side gear mounted for rotation about an axis;

a spider hub connected to a differential spider, said spider hub mounting a plurality of pinion gears, said pinion gears having teeth at an outer periphery engaged with teeth on said first side gear;

a second side gear mounted for rotation about said axis, and having teeth engaged with said pinion gear teeth, and on an opposed side of said pinion gears relative to said first side gear; and said pinion gear teeth and said first and second side gear teeth being angled in a direction such that an outer diameter of said pinion gear teeth decreases in diameter along a radially outward dimension, and said teeth of said first and second side gears extend away from each other along a direction toward an axis of said spider hub.

2. A differential assembly as recited in claim 1, wherein said pinion gears are supported on said side gears, and not supported in a differential case.

3. A differential assembly as recited in claim 1, wherein said spider hubs do not extend beyond a radially outermost end of said pinion gears.

4. A differential assembly as recited in claim 1, wherein said spider hub is driven by a drive input shaft, said hub driving said first and second side gears, and a collar being positioned to selectively connect one of said side gears to said drive input shaft for direct drive when a decision has been made that a differential lock would be desirable.

\* \* \* \* \*